(12) United States Patent
Kim et al.

(10) Patent No.: US 11,435,686 B2
(45) Date of Patent: Sep. 6, 2022

(54) DETECTION OF WASTE TONER USING TONER AMOUNT DETECTION SENSOR AND SWITCH

(71) Applicant: Hewlett-Packard Development Company, L.P., Spring, TX (US)

(72) Inventors: Dang-you Kim, Pangyo (KR); Junbin Im, Pangyo (KR); Jaehee Han, Pangyo (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/413,742

(22) PCT Filed: May 18, 2020

(86) PCT No.: PCT/US2020/033389
§ 371 (c)(1),
(2) Date: Jun. 14, 2021

(87) PCT Pub. No.: WO2020/256871
PCT Pub. Date: Dec. 24, 2020

(65) Prior Publication Data
US 2022/0100137 A1    Mar. 31, 2022

(30) Foreign Application Priority Data
Jun. 18, 2019    (KR) .................... 10-2019-0072301

(51) Int. Cl.
G03G 15/00 (2006.01)
G03G 21/10 (2006.01)
G03G 21/12 (2006.01)

(52) U.S. Cl.
CPC .......... *G03G 15/556* (2013.01); *G03G 15/80* (2013.01); *G03G 21/105* (2013.01); *G03G 21/12* (2013.01)

(58) Field of Classification Search
CPC ...... G03G 15/55; G03G 15/553; G03G 21/12; G03G 21/169
(Continued)

(56) References Cited

U.S. PATENT DOCUMENTS 7,356,269 B2 *  4/2008  Park ..................... G03G 15/553
                                                                399/35
8,204,390 B2     6/2012  Kobayashi
(Continued)

FOREIGN PATENT DOCUMENTS

JP    2003345203 A    12/2003
JP    2008216445 A    9/2008
(Continued)

*Primary Examiner* — William J Royer
(74) *Attorney, Agent, or Firm* — Jefferson IP Law, LLP

(57) ABSTRACT

An image forming apparatus includes a main body, a print engine, a detection circuit, a switch, and a processor. The print engine is located within the main body to form an image by using a toner. The print engine generates waste toner. A waste toner container is detachably mountable to the main body of the image forming apparatus and collects the waste toner. The detection circuit includes a toner amount detection sensor to output a voltage value associated with an amount of waste toner in the waste toner container and a switch to selectively output the voltage value depending on whether the waste toner container is mounted or detached. The processor determines whether printing is available based on the voltage value outputted from the detection circuit.

20 Claims, 11 Drawing Sheets

(58) Field of Classification Search
USPC .................................................. 399/35, 360
See application file for complete search history.

(56) References Cited

U.S. PATENT DOCUMENTS

2009/0066749 A1   3/2009   Young et al.
2010/0080600 A1   4/2010   Okamoto et al.

FOREIGN PATENT DOCUMENTS

| JP | 2012058284 A | 3/2012 |
| JP | 2013037204 A | 2/2013 |
| JP | 2016206593 A | 12/2016 |

* cited by examiner

300

DETECTION OF WASTE TONER USING TONER AMOUNT DETECTION SENSOR AND SWITCH

BACKGROUND

An image forming apparatus is an apparatus for generating, printing, receiving and transmitting image data. Some examples of the apparatus include a printer, a copy machine, a facsimile, and a multifunction peripheral (MFP) that integrally implements these functions.

An image forming apparatus may be operated with one of an inkjet system, a dot-jet system, a laser printer system, and the like according to the printing method of the image forming apparatus. The laser printer system may be operated with a method in which a toner is attached to a photosensitive drum on which an electrostatic latent image is formed to convert the electrostatic latent image into a visible toner image, and the toner image is transferred onto paper.

DETAILED DESCRIPTION

In the following description, with reference to the drawings, the same reference numbers are assigned to the same components or to similar components having the same function, and overlapping description is omitted.

In the present disclosure, a case in which any component is "connected" with another component may refer to a case in which any component is 'directly connected' to another component and a case in which a component is 'connected to another component via yet another component interposed therebetween. In addition, a case in which any component "comprises" another component may indicate that a component may comprise additional components, without excluding other components, unless it is explicitly described as the contrary.

The expression "image forming job" as used herein may refer to various jobs or operations related with imaging, such as, formation of image or generation/storage/transmission of image files (e.g., printing, scanning or faxing), and the expression "job" as used herein may refer to an image forming job, or to a series of processes carried out for performance of the image forming job.

In addition, an "image forming apparatus" may refer to a device for printing print data generated from a terminal such as a computer on a recording paper. Examples of the image forming apparatus described above may include a copier, a printer, a facsimile, a multi-function printer (MFP) that complexly implement functions thereof through a single device, and the like.

The expression "printing data" may refer to data converted into a format that may be printed by a printer. In some examples, when the printer supports direct printing, the printing data may be comprised of a data file or image file.

The expression "user" may refer to a person who performs one or more manipulation related with the image forming job using the image forming apparatus or a device connected to the image forming apparatus via wire communication or wirelessly.

Figure 1:
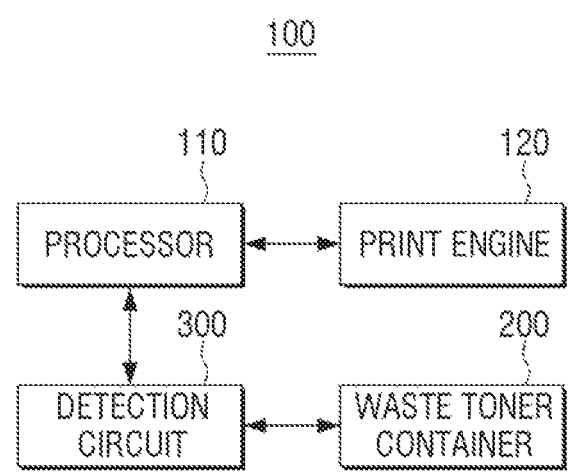
FIG. 1 is a block diagram schematically illustrating a configuration of an example image forming apparatus.

FIG. 1 is a block diagram illustrating an example image forming apparatus.

Referring to FIG. 1, an example image forming apparatus 100 may include a processor 110, a print engine 120, a waste toner container 200, and a detection circuit 300.

The print engine 120 may form an image using a toner. The print engine 120 may form an image on a printing medium (or paper) using a photosensitive drum. An example configuration and operation of the print engine 120 will be described with reference to FIG. 3.

The waste toner container 200 may collect the waste toner generated by the print engine 120. The waste toner container 200 may have a container shape that contains a waste toner, and collect the waste toner discharged from a cleaning member 129 of the print engine 120 shown in FIG. 3.

The waste toner container 200 may be a replaceable consumable product. When the waste toner container 200 is not mounted on the image forming apparatus 100, or when the waste toner container 200 is full, a print job may not be available (e.g., the apparatus may be prevented from proceeding to a printing operation). Therefore, whether the waste toner container 200 is mounted or not and/or the amount of waste toner (or toner amount) in the waste toner container 200 need to be confirmed or determined.

In some examples, the detection circuit 300 is used to output a voltage value associated with the amount of waste toner in the waste toner container 200. For example, the detection circuit 300 outputs 0 V or the voltage of a power supply terminal (Vcc) when the waste toner container 200 is not mounted. An example configuration and operation of the detection circuit 300 will be described with reference to FIG. 4 to FIG. 10.

The processor 110 may control the elements of the image forming apparatus 100. The processor 110 may determine whether the waste toner container 200 is mounted, and whether the amount of waste toner in the waste toner container 200 is to be detected. For example, in the occurrence of an event such as when the image forming apparatus 100 is initially driven, when an output job for printing more than a predetermined number of pages is performed, or when the cover of the image forming apparatus 100 is opened or closed, the processor 110 may determine or detect whether the waste toner container 200 is mounted or not as well as the amount of waste toner contained in the waste toner container 200.

When it is confirmed that the amount of waste toner is to be detected, the processor 110 may control the detection circuit 300 to perform a detection operation. The processor 110 may control the detection circuit 300 so that a driving power is applied to a toner amount detection sensor 310 to detect the waste toner amount.

The processor 110 may determine whether printing is available (e.g., whether to operate the image forming apparatus to print) based on the voltage value output from the detection circuit 300. The processor 110 may be equipped with an Analog Digital Converter (ADC) port for receiving the voltage value, and determine whether the waste toner container 200 is mounted (or whether it is detached or removed from the image forming apparatus 100) and the waste toner amount of the waste toner container 200 based on the voltage value detected at the ADC port.

Once it is determined that the waste toner container 200 is not mounted, the processor 110 may determine that a print job is not available, and may change an operation state of the image forming apparatus 100 to an error state.

When the waste toner container 200 is mounted (e.g., a mounted state), but the waste toner amount corresponds to a value (e.g., a predetermined second setting value or second threshold) associated with a full state of the waste toner in the waste toner container 200 (e.g., a state wherein the waste toner container 200 is full), the processor 110 may determine that the print job is not available, and change the operation state of the image forming apparatus 100 to the error state. The error state may be associated with a state of the image forming apparatus 100, in which a print job is not available due to an operational issue in the image forming apparatus.

When the waste toner container 200 is mounted, but the waste toner amount is equal to or more than a predetermined value (e.g., a first setting value, or first threshold, less than a second setting value), the processor 110 may determine that the waste toner container 200 is to be replaced, and change the operation state of the image forming apparatus 100 to a warning state.

Figure 2:
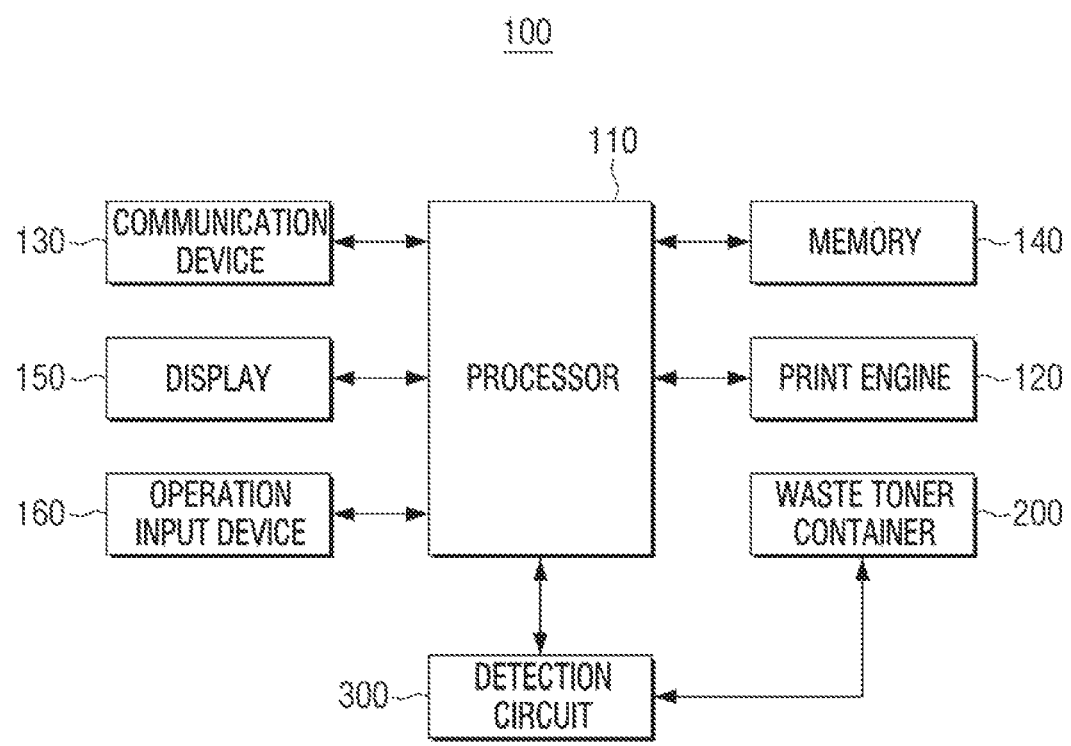
FIG. 2 is a block diagram schematically illustrating a configuration of an example image forming apparatus.

The warning state may be associated with an operation mode in which a print job is available, but a manager or a user is informed of a replacement of the waste toner container 200, or it is displayed that the waste toner container 200 is to be replaced via a display 150 shown in FIG. 2.

When the waste toner container 200 is mounted, and the amount of waste toner is less than the predetermined value (e.g., the first setting value or first threshold), the processor 110 may determine that the print job is available.

An example image forming apparatus will be described with reference to FIG. 2.

FIG. 2 is a block diagram illustrating an example image forming apparatus 100.

Referring to FIG. 2, the example image forming apparatus 100 may include a processor 110, a print engine 120, a communication device 130, a memory 140, a display 150, an operation input unit (or operation input device) 160, a waste toner container 200 and a detection circuit 300.

The print engine 120, the waste toner container 200 and the detection circuit 300 may perform similar functions as the corresponding elements described with reference to FIG. 1, and redundant description thereof will be omitted. An operation of the processor 110 has been described with reference to FIG. 1, and redundant description thereof will be omitted.

The communication device 130 may be connected to a print control terminal device, to receive print data from the print control terminal device. For example, the communication device 130 may connect the image forming apparatus 100 to an external device, and be connected to a terminal device through a local area network (LAN) and the Internet network as well as Universal Serial Bus (USB) port or a wireless communication (e.g., Wi-Fi 802.11a/b/g/n, Near Field Communication (NFC), and Bluetooth) port. Such communication device 130 may also be referred to as a transceiver.

When the waste toner container 200 is to be replaced, the communication device 130 may notify a managing server or a manager (e.g., the manager of the terminal device) that the waste toner container 200 is to be replaced.

The memory 140 may store print data received through the communication device 130. The memory 140 may store information on the detected waste toner amount.

The memory 140 may include a storage medium in the image forming apparatus 100 or an external storage medium, for example, a removable disk such as a USB memory, a web server via network, etc.

The display 150 may display various information provided by the image forming apparatus 100. The display 150 may display a user interface window for selecting various functions provided by the image forming apparatus 100. The display 150 may include a monitor such as an Liquid Crystal Display (LCD), a Cathode-Ray Tube (CRT), or an Organic Light-Emitting Diode (OLED), or a touch screen capable of simultaneously performing functions of the operation input unit or device 160, as will be described below.

The display 150 may display a control menu for performing the function of the image forming apparatus 100.

The display 150 may display information on a consumable product. When it is determined that the waste toner container 200 is to be replaced, the display 150 may display replacement information. The display 150 may display information on a replacement prediction time point.

The display 150 may display error information. For example, when a print job is not available because the waste toner container 200 is not mounted, and the waste toner is full in the waste toner container 200, the display 150 may display that the print job is not available.

The operation input device 160 may receive a function selection and a control command for the function from a user. Examples of the function may include a print function, a copy function, a scan function, a fax transmission function, etc. The function control command may be received through a control menu displayed on the display 150.

The operation input device 160 may include a plurality of buttons, a keyboard, a mouse, etc. or a touch screen that simultaneously perform the function of the display 150.

When receiving print data from a print control terminal device, the processor 110 may control the print engine 120 to print the received print data. The print control terminal device may be an electronic apparatus for providing print data such as a personal computer (PC), a laptop, a tablet PC, a smart phone, a server, and the like.

The processor 110 may predict the lifespan of the waste toner container 200 based on information on a change of the waste toner amount, stored in the memory 140. When the predicted life span reaches at a predetermined time point, the processor 110 may control the display 150 to display an expected lifespan, or control the communication device 130 to notify a user of the expected lifespan.

When the operation mode of the image forming apparatus 100 is a warning mode, e.g., when the waste toner is equal or greater than the predetermined amount, the processor 110 may control the display 150 to display that the waste toner container 200 is to be replaced.

When the operation mode of the image forming apparatus 100 is an error mode, the processor 110 may control the display 150 to display that the waste toner container 200 is to be replaced. When a print job is requested from the print control terminal device in the error mode, the processor 110 may control the communication device 130 to notify a user that the print job is not available.

After the warning mode or the error mode, when the user replaces the waste toner container 200, the processor 110 may identify whether the waste toner container 200 is mounted, and the amount of waste toner in the waste toner container 200. When the waste toner container 200 is mounted, and the amount of waste toner in the waste toner container 200 has a value within a normal range, the operation mode of the image forming apparatus 100 may be changed from the warning mode or the error mode to the normal mode.

The image forming apparatus 100 may reduce manufacturing or operational costs by identifying whether the waste toner container 200 is mounted and the amount of waste toner in the waste toner container 200 by using a single sensor. In addition, the processor 110 may be designed without much limitation because whether the waste toner container 200 is mounted and the amount of waste toner can be identified by using a single port, thereby reducing complexities in the implementation of the processor 110.

In description of FIG. 1 and FIG. 2, the waste toner container 200 and the print engine 120 have been separately described. However, the waste toner container 200 may be included in the print engine 120. The detection circuit 300 may be included in the print engine 120.

Figure 3:
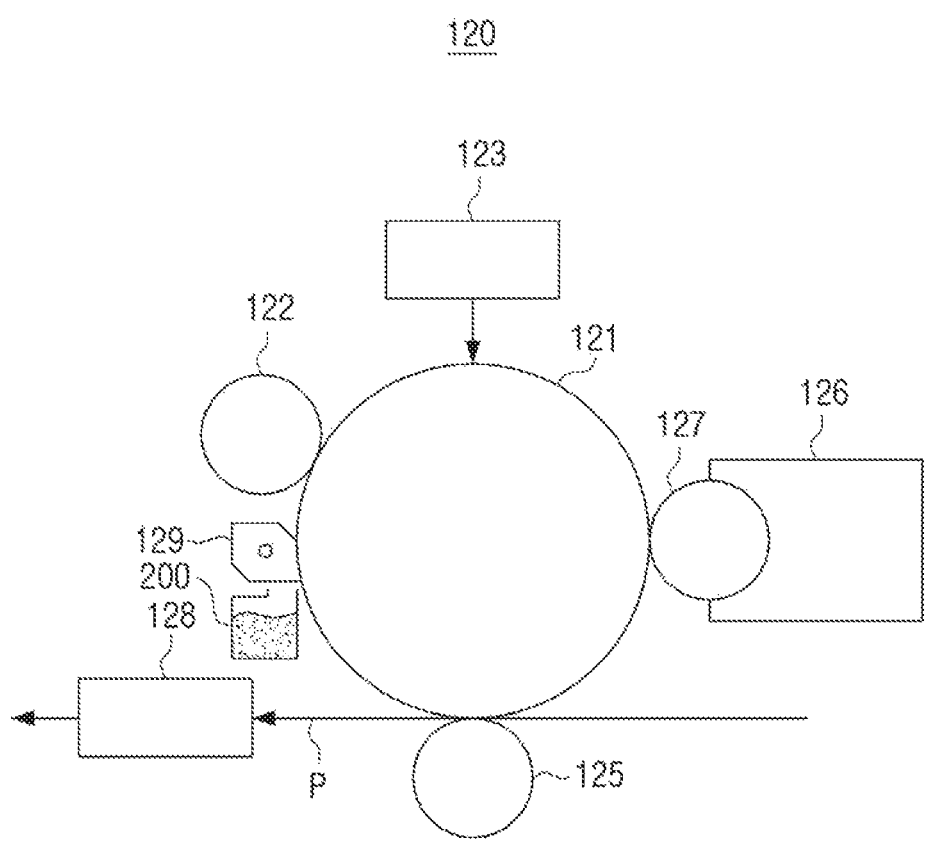
FIG. 3 is a schematic diagram of an example print engine in the image forming apparatus of FIG. 1.

FIG. 3 is a view to explain an example of a detailed configuration of the print engine of FIG. 1.

Referring to FIG. 3, the print engine 120 may include a photosensitive drum 121, a charger 122, an exposure device 123, a transfer device 125, a developer 126, a fuser 128, and a cleaning member 129.

The electrostatic latent image may be formed on the photosensitive drum 121. The photosensitive drum 121 may be replaced with a photosensitive belt, or another suitable form depending on examples.

The charger 122 may charge the surface of the photosensitive drum 121 to a uniform potential. The charger 122 may be implemented in the form of a corona charger, a charging roller, a charging brush, or the like.

The exposure device 123 may form an electrostatic latent image on the surface of the photosensitive drum 121 by changing a surface potential of the photosensitive drum 121 according to image information to be printed.

The developer 126 may include a developer agent therein and develop the electrostatic latent image into a visible image. The developer 126 may include a developing roller 127 which supplies the developer agent to the electrostatic latent image. The developer 126 may be contained in a toner cartridge that is replaceable.

The visible image formed onto the photosensitive drum 121 may be transferred to a printing medium P by the transfer device 125 or an intermediate transfer belt (ITB).

The fuser 128 may fix the visible image to the printing medium P by applying heat and pressure to the visible image on the printing medium P. Through a series of processes, a print job may be completed.

The cleaning member 129 may remove the remaining toner that is not transferred to the printing medium P of the image forming on the photosensitive drum 121, and discharge the remaining toner to be removed to the waste toner container 200. When the waste toner container 200 is filled with waste toner, the waste toner may be replaced by a new waste toner container 200. The waste toner container 200 may be referred to as a consumable product because the waste toner container 200 can be replaced.

As described above, the cleaning member 129 and the waste toner container 200 are illustrated separately, but at the time of implementation, all or part of the cleaning member 129 may be combined with the waste toner container 200.

Figure 4:
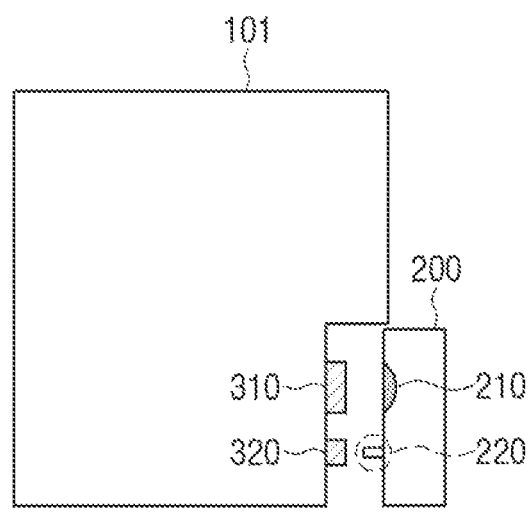
FIG. 4 is a schematic diagram of a body of an example image forming apparatus and a mountable waste toner container.

FIG. 4 is a view illustrating an example of a mounting type of a waste toner container 200.

Referring to FIG. 4, a body (or main body) 101 of the image forming apparatus 100 may include an area (e.g., a mounting area) in which the waste toner container 200 is mounted.

The waste toner container 200 may be mounted at the mounting area, and when the waste toner container 200 is mounted on the body 101, referring to FIG. 3, waste toner discharged from the cleaning member 129 may be collected therein. The waste toner container 200 may include an optical member 210 and a protrusion member 220 on a surface that contacts the body 101.

The optical member 210 may transmit light from the outside to the inside of the waste toner container 200. The optical member 210 may be provided as a single member or a plurality of optical members. For example, when provided as a single optical member, the optical member 210 may include a lens, and when provided as a plurality of optical members, the optical member 210 may include a plurality of optical waveguides. A description thereof will be made with reference to FIG. 5.

The protrusion member 220 may be shaped to protrude from a surface of the waste toner container 200 and operate a switch 320 even when the waste toner container 200 is spaced away from the body 101.

In some example, the switch 320 may be operated through contact with a contact surface of the waste toner container 200, and the protrusion member 220 may be omitted.

The detection circuit 300 (FIG. 2) may include the switch 320 for detecting the mounting of the waste toner container 200 as well as the toner amount detection sensor 310 for detecting the amount of waste toner in the waste toner container 200.

Referring to FIG. 4, the toner amount detection sensor 310 may be disposed on a side of the body 101 facing the optical member 210 of the waste toner container 200. The toner amount detection sensor 310 may output a voltage value associated with the amount of waste toner in the waste toner container 200. An example configuration and circuit of the toner amount detection sensor 310 will be described with reference to FIG. 5 to FIG. 10.

The switch 320 may be disposed on a surface of the body 101 where the waste toner container 200 is to be mounted, and the electrical connection state of the switch 320 may vary depending on whether the waste toner container 200 is mounted or not. In some examples, when the waste toner container 200 is mounted, both ends of the switch 320 may be shorted (e.g., the ends of the switch 320 may be connected to conduct current to the circuit in the body 101), and when the waste toner container 200 is detached, both ends of the switch 320 may be opened so as to disconnect the circuit of the switch 320 and interrupt the flow of electric current. In other examples, when the waste toner container 200 is mounted, both ends of the switch 320 may be opened, and when the waste toner container 200 is detached, both ends of the switch 320 is shorted.

The switch 320 may be electrically located between the toner amount detection sensor 310 and the processor 110 to selectively output the output value of the toner amount detection sensor 310 to the processor 110, depending on whether or not the waste toner container 200 is mounted onto the body 101.

The switch 320 may be an interlock switch, or may include a plurality of terminals and a conductive member. An example interlock switch will be described with reference to FIG. 5. An example where the switch 320 includes a plurality of terminals and a conductive member will be described with reference to FIG. 6.

FIG. 4 schematically illustrates the body 101 to include the toner amount detection sensor 310 and the switch 320. In some examples, a locking member that is physically fixed to the waste toner container 200 may be added to the body 101 or the waste toner container 200.

Figure 5:
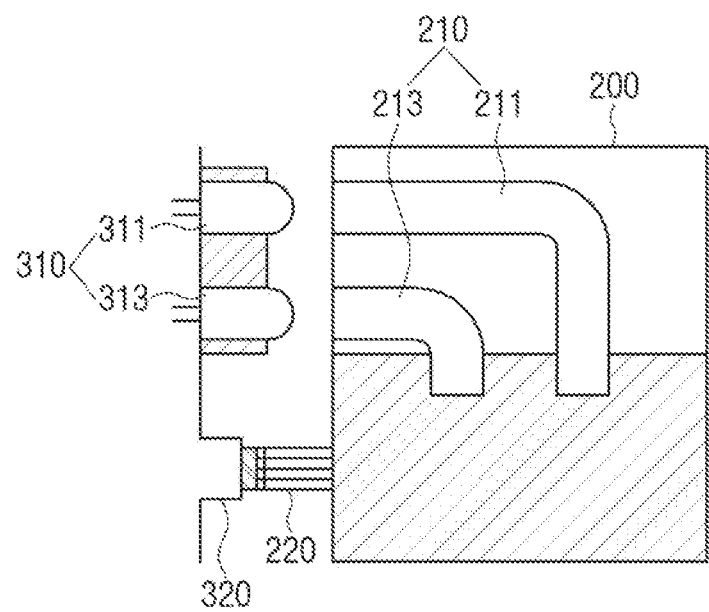
FIG. 5 is a schematic diagram of an example arrangement of a toner amount detection sensor and a switch in an image forming apparatus.

FIG. 5 is a schematic diagram illustrating an example arrangement of a toner amount detection sensor 310 and a switch 320.

Referring to FIG. 5, the waste toner container 200 may include an optical member 210. The optical member 210 may include optical waveguides 211 and 213.

The first optical waveguide 211 may be an optical waveguide for transmitting light irradiated from an external source into an inside of the waste toner container 200. When light is irradiated from the external source (e.g., a light emitter 311), the irradiated light may be transmitted into the inside of the waste toner container 200 through the first optical waveguide 211. The light transmitted into the inside may be reflected in the waste toner container 200, and part of the reflective light may be incident on the second optical waveguide 213.

The second optical waveguide 213 may be an optical waveguide extending from a first end located inside the waste toner container 200 to a second end located at an outer surface (or outside) of the waste toner container 200, to transmit light reflected in the waste toner container 200 to the outside. Accordingly, the light incident on the first end on inside of the second optical waveguide 213 may be transmitted to the second end on outside of the second optical waveguide 213.

When the amount of waste toner inside the waste toner container 200 increases, the amount of light reflected from the inside of the waste toner container 200 to the second optical waveguide 213 may decrease. In addition, if the waste toner is accumulated in a sufficient amount to fill the inside of the first optical waveguide 211 and of the second optical waveguide 213, the second optical waveguide 213 may output no light or very little light.

The toner amount detection sensor 310 may include a light emitter 311 and a light receiver 313 to be disposed adjacent to each other, and positioned to align with the optical waveguides 211 and 213 of the waste toner container 200. Accordingly, the circuit design in the image forming apparatus 100 may be simplified because the light emitter 311 and the light receiver 313 are mounted to be adjacent to each other.

The light emitter 311 may irradiate light. The light emitter 311 may be disposed to be opposite to the end of the outside of the first optical waveguide 211, and when a driving power is applied, the light emitter 311 may irradiate light toward the first optical waveguide 211.

Accordingly, the light irradiated from the light emitter 311 may be transmitted to the inside of the waste toner container 200 through the first optical waveguide 211, and part of the reflective light may be output to the outside through the second optical waveguide 213.

The light receiver 313 may detect light, and output a voltage value associated with the detected light. The light receiver 313 may be positioned to face the second end of the second optical waveguide 213 at the outer surface of the waste toner container 200, and may output a voltage value corresponding to a light intensity (or light amount) output from the second optical waveguide 213.

In some examples, the light receiver may include a Negative-Positive-Negative (NPN) type light receiver (hereinafter referred to as NPN light receiver) that outputs a voltage value in proportion to the intensity of light. In some examples, the light receiver may include a Positive-Negative-Positive (PNP) type light receiver (hereinafter referred to as PNP light receiver) that outputs a voltage value inversely proportional to the intensity of light. An example NPN light receiver 314 will be described with reference to FIG. 7 and FIG. 8. An example PNP light receiver 315 will be described with reference to FIG. 9 and FIG. 10.

The switch 320 may be located to face the protrusion member 220 of the waste toner container 200, and the electrical connection state of the switch 320 may be either shorted or opened depending on whether the waste toner container 200 is mounted. At the time of implementation, an interlock switch may be used as the switch 320.

In some examples, the interlock switch may include a first type that is shorted in the presence of pressure, and opened in the absence of pressure. In some examples, the interlock switch may include a second type that is opened in the presence of pressure (when pressed), and shorted (e.g., closed) in the absence of pressure (when not pressed). The case using the said first type will be described with reference to FIG. 7 and FIG. 8, and the case using the said second type will be described with reference to FIG. 9 and FIG. 10.

The protrusion member 220 of the waste toner container 200 may allow contact with the body 101, when the waste toner container 200 is mounted with a distance between the waste toner container 200 and the body 101. The protrusion member 220 of the waste toner container 200 may be located at a position on the waste toner container 200 to face the interlock switch. The protrusion member 220 may be provided when the image forming apparatus 100 is designed to mount the waste toner container 200 to the body 101 with a space or distance between the waste toner container 200 and the body 101. Thus, in some examples the protrusion member 220 could be omitted for example, when a lack of contact resulting from the distance does not occur.

Figure 6:
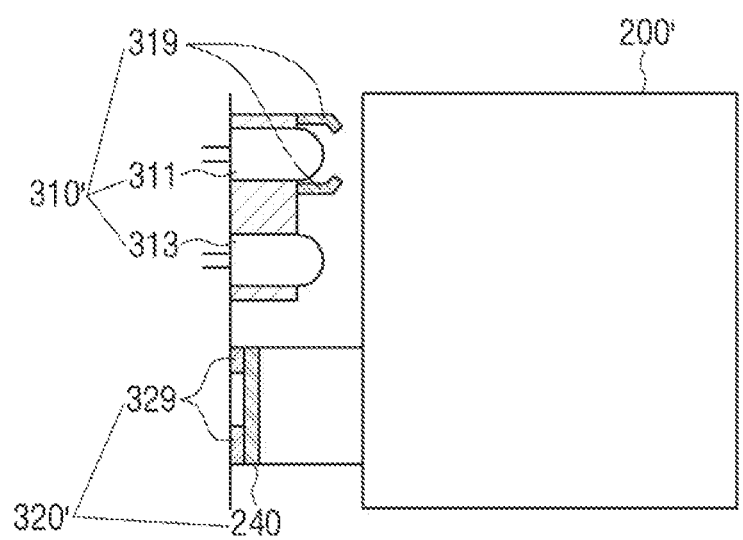
FIG. 6 is a schematic diagram of an example toner amount detection sensor type and an example switch.

The elements illustrated in FIG. 6 are similar to those illustrated in FIG. 5, however a conductive member 240 is further disposed on the surface of the protrusion member 220 of a waste toner container 200'. Elements illustrated in FIG. 6, that differ from those illustrated in FIG. 5 will be described.

A toner amount detection sensor 310' may include a light emitter 311, a light receiver 313 and a guide member 319 disposed to be adjacent to one another.

The light emitter 311 and the light receiver 313 may perform similar functions as those of FIG. 5.

The guide member 319 may guide light irradiated from the light emitter 311 in a forward direction. Accordingly, light irradiated from the light emitter 311 may be prevented from being directly transmitted to the light receiver 313.

An example switch 320' may comprise two terminals 329 and the conductive member 240.

The two terminals 329 may be spaced apart on the body 101. The two terminals 329 may correspond to the ends of the switch 320'.

The conductive member 240 may be formed on the protrusion member 220, so as to electrically connect the two terminals 329 on the side of the body 101 when the waste toner container 200' is mounted onto the body 101.

Accordingly, the switch 320' according to the second example may be opened in a state in which the waste toner container 200' is not mounted, and may be shorted by the conductive member 240 of the waste toner container 200' when the waste toner container 200' is mounted.

In the example illustrated in FIG. 6, the guide member 319 is disposed in the vicinity of the light emitter 311. The function of the guide member 319 is to prevent the light of the light emitter 311 from being directly irradiated to the light receiver 313. Accordingly, in some examples, the guide member 319 may be disposed in the vicinity of the light receiver 313, or disposed between the light emitter 311 and the light receiver 313.

FIG. 4 to FIG. 6 illustrate examples where the switch includes an interlock switch or a plurality of terminals and a conductive member, and in the example, when the waste toner container is mounted, the switch may be shorted or opened. Additionally, when the waste toner container is detached, the switch may be electrically opened or shorted). Other configurations of the switch may be used in other examples.

Figure 7:
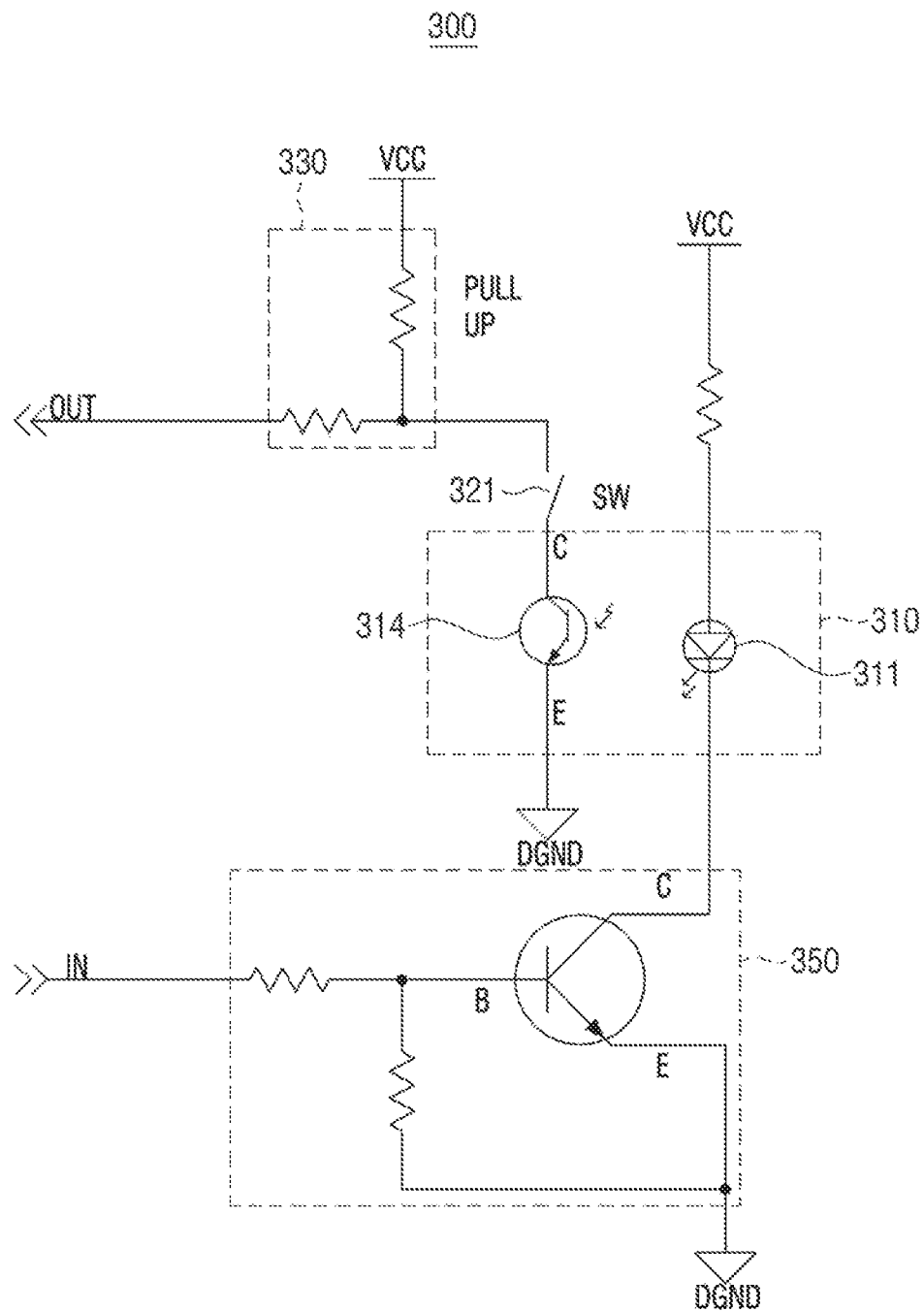
FIG. 7 is a circuit diagram of an example detection circuit.

FIG. 7 is a circuit diagram illustrating an example detection circuit 300 that includes a pull-up circuit 330, and an NPN light receiver 314.

Referring to FIG. 7, the detection circuit 300 may include a toner amount detection sensor 310, a switch 321, the pull-up circuit 330, and a driving circuit 350.

The toner amount detection sensor 310 may comprise the light emitter 311 and the NPN light receiver 314.

The light emitter 311 may irradiate light when a driving power is received from the driving circuit 350. One end of the light emitter 311 may be connected to a power supply terminal through a resistance, and the other end may be connected to one end of the driving circuit 350 (e.g., a cathode of a transistor). The light emitter 311 may include a Light-Emitting Diode (LED).

One end of the NPN light receiver 314 may be connected to the switch 321, and the other end of the NPN light receiver 314 may be grounded. Since the NPN light receiver 314 is an NPN light receiver, the NPN light receiver 314 may be turned on when light is sensed, and when light is not sensed, may be turned off to output a voltage value corresponding to a light intensity.

The switch 321 may be shorted when the waste toner container 200 is mounted, and may be opened when the waste toner container 200 is detached. One end of the switch 321 may be connected to the pull-up circuit 330, and the other end of the switch 321 may be connected to the NPN light receiver 314. In some examples, the switch 321 may be an interlock switch, and in other examples, the switch 321 may include two terminals and a conductive member with reference to FIG. 6.

The pull-up circuit 330 may comprise two resistances and may be a circuit that outputs a voltage of the power supply terminal Vcc to the output terminal in a floating state (e.g., in a state in which the waste toner container 200 is not amounted). One end of the pull-up circuit 330 may be connected to an ADC port of the processor 110, and another end of the pull-up circuit 330 may be connected to the switch 321.

The driving circuit 350 may provide a driving power to the light emitter 311 according to a control signal of the processor 110.

When the waste toner container 200 is not connected (e.g., not mounted), the switch 321 of the detection circuit 300 may be turned off (e.g., to interrupt the conductive path), and the power of the power supply terminal Vcc may be provided to the ADC port of the processor 110. When the waste toner container 200 is not connected, the detection circuit 300 may output a voltage that corresponds to the power supply terminal Vcc.

When the waste toner container 200 is connected (e.g. mounted on the body 101), the switch 321 may be turned on to close the conducting path, and the detection circuit 300 may output a voltage value associated with the waste toner amount, wherein the voltage value may be within a voltage range from 0V to a voltage lower than the voltage of the power supply terminal by a predetermined voltage value.

When a voltage corresponding to the magnitude of the power supply terminal is input at the processor 110, the processor 110 may determine that the waste toner container 200 is not mounted.

When a voltage value within the voltage range is input, the processor 110 may calculate the amount of waste toner associated with the input voltage value. As the amount of waste toner in the waste toner container 200 increases, the voltage value of the NPN light receiver 314 decrease. Accordingly, in some examples, the output voltage value of the detection circuit 300 may be inversely proportional to the amount of waste toner.

Figure 8:
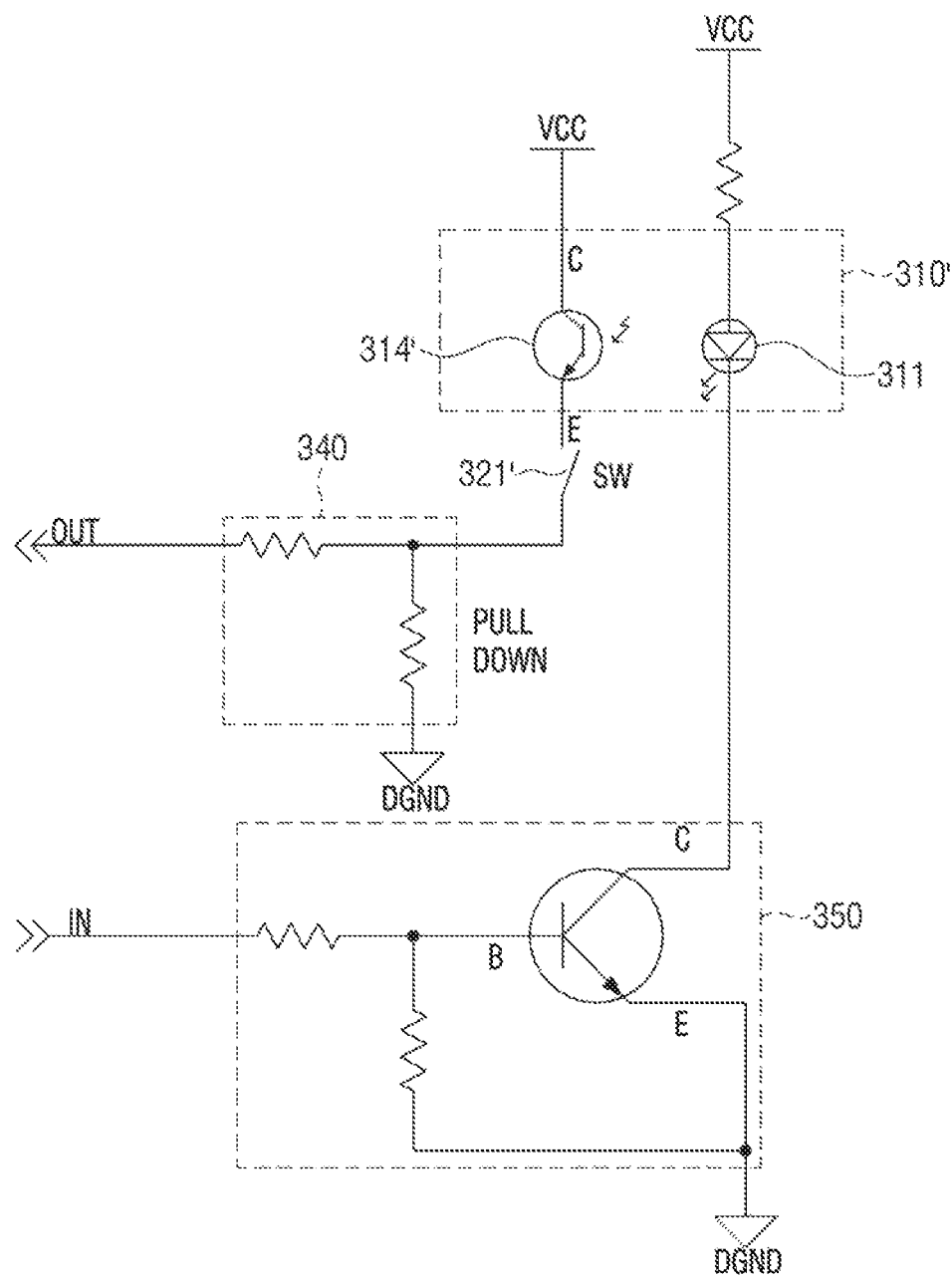
FIG. 8 is a circuit diagram of an example detection circuit.

FIG. 8 is a circuit diagram of another example detection circuit 300' that includes a pull-down circuit 340, and an NPN light receiver 314'.

Referring to FIG. 8, the detection circuit 300' may include a toner amount detection sensor 310', a switch 321', a pull-down circuit 340, and the driving circuit 350.

The operations of the light emitter 311 and the driving circuit 350 are similar to those described with reference to FIG. 7.

One end of the NPN light receiver 314' may be connected to the switch 321', and the other end may be connected to the power supply terminal Vcc.

The switch 321' may be shorted (e.g., closed) when the waste toner container 200 is mounted on the body 101, and opened when the waste toner container 200 is detached. One end of the switch 321' may be connected to the pull down circuit 340, and the other end may be connected to the NPN light receiver 314'. In some examples, the switch 321' may include an interlock switch, and in other examples, the switch 321' may include the two terminals and the conductive member described with reference to FIG. 6.

The pull-down circuit 340 comprising two resistances may output 0V voltage to the output terminal in a floating state (e.g., in a state in which the waste toner container 200 is not mounted). One end of the pull down circuit 340 may be connected to the ADC port of the processor 110, and another end may be connected to the switch 321'.

When the waste toner container 200 is not connected, the switch 321' of the detection circuit 300' may be turned off, and thus the ADC port of the processor 110 may be connected to the ground. The detection circuit 300' may output a voltage of 0V when the waste toner container 200 is not connected.

When the waste toner container 200 is connected, the switch 321' may be turned on, the detection circuit 300' may output a voltage value associated with the amount of waste toner, within a voltage range from a voltage slightly higher than 0V to the voltage of the power supply terminal Vcc.

Therefore, when a voltage of 0V is input at the ADC port of the processor 110, the processor 110 may determine that the waste toner container 200 is not mounted.

When a voltage value within the voltage range is input to the processor 110, the processor 110 may calculate the amount of waste toner associated with the input voltage value. As the amount of waste toner increases in the waste toner container 200, the voltage value of the NPN light receiver 314' may decrease. Accordingly, in some examples, the output voltage value of the detection circuit 300' may be inversely proportional to the amount of waste toner.

Figure 9:
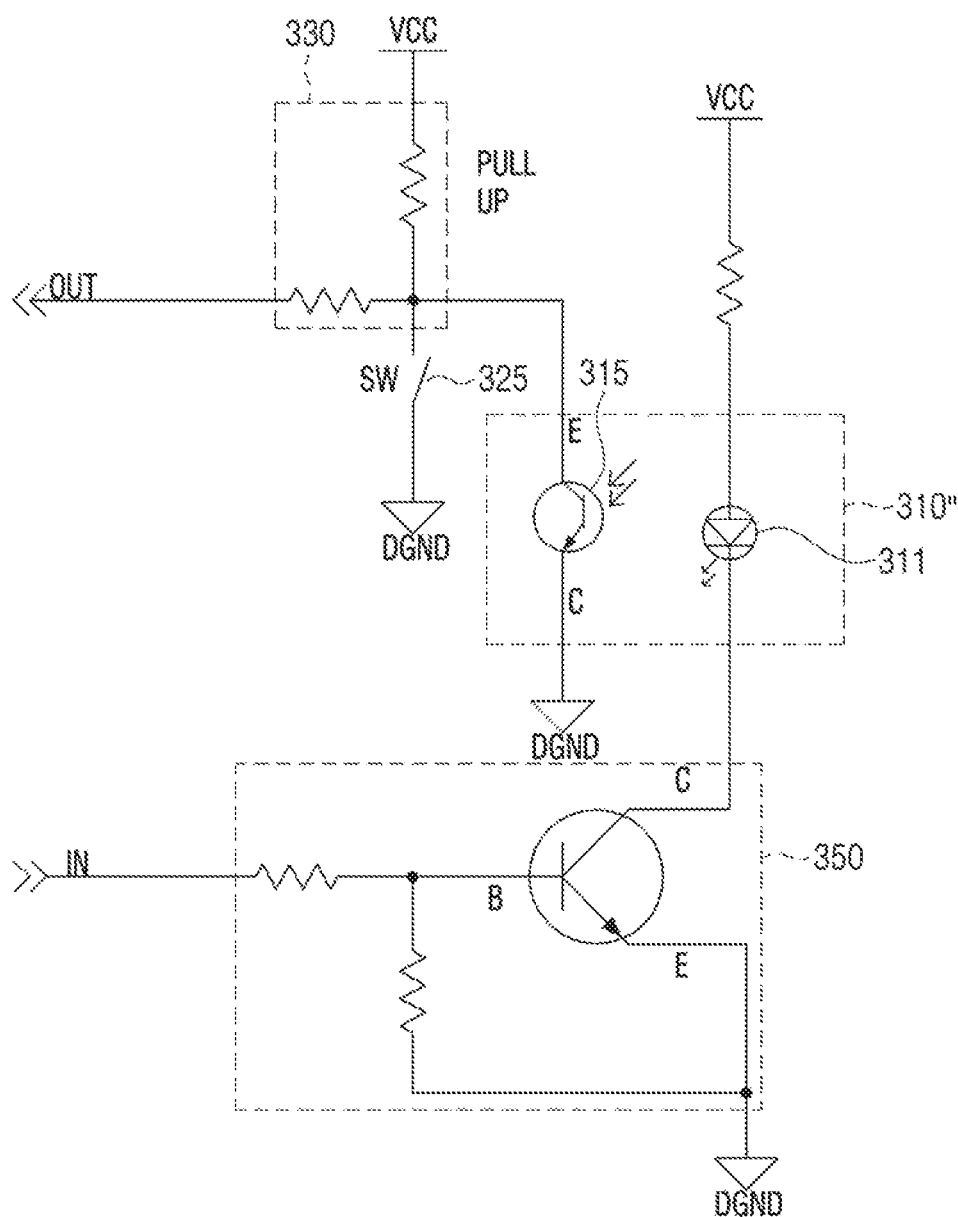
FIG. 9 is a circuit diagram of an example detection circuit.

FIG. 9 is a circuit diagram of another example detection circuit 300" that includes a pull up circuit 330, and the PNP light receiver 315.

Referring to FIG. 9, the detection circuit 300" may comprise a toner amount detection sensor 310", a switch 325, the pull-up circuit 330, and the driving circuit 350.

The operations of the light emitter 311 and the driving circuit 350 are similar to those of FIG. 7.

One end of the PNP light receiver 315 may be connected to both the switch 325 and the pull-up circuit 330, and the other end may be grounded.

The switch 325 may be opened when the waste toner container 200 is mounted, and the switch 325 may be closed when the waste toner container 200 is detached. One end of the switch 325 may be connected to both the pull-up circuit 330, and the PNP light receiver 315, and the other end of the switch 325 may be grounded. The switch 325 may be an interlock switch.

The pull-up circuit 330 comprising two resistances may output a voltage of 0V to the output terminal in a floating state (e.g., in a state where the waste toner container 200 is not mounted). One end of the pull-up circuit 330 may be connected to the ADC port of the processor 110, and the other end may be connected to the switch 325 and to the PNP light receiver 315.

When the waste toner container 200 is not connected, the switch 325 of the detection circuit 300" may be turned on (e.g., closed), and thus the ADC port of the processor 110 may be connected to the ground. Accordingly, when the waste toner container 200 is not connected, the detection circuit 300" may output the voltage of 0V.

When the waste toner container 200 is connected, the switch 325 may be turned off (opened), and thus the detection circuit 300" may output a voltage value associated with the amount of waste toner from a voltage slightly higher than 0V to the voltage of the power supply terminal Vcc.

Therefore, when a voltage of 0V is input at the ADC port of the processor 110, the processor 110 may determine that the waste toner container 200 is not mounted.

When a voltage value within the voltage range is input to the processor 110, the amount of waste toner associated with the input voltage value may be calculated. Through the use of the PNP light receiver 315, as the amount of waste toner in the waste toner container 200 increases, the voltage value of the PNP light receiver 315 may increase. Accordingly, in some examples, the output voltage value of the detection circuit 300" may be proportional to the amount of waste toner.

Figure 10:
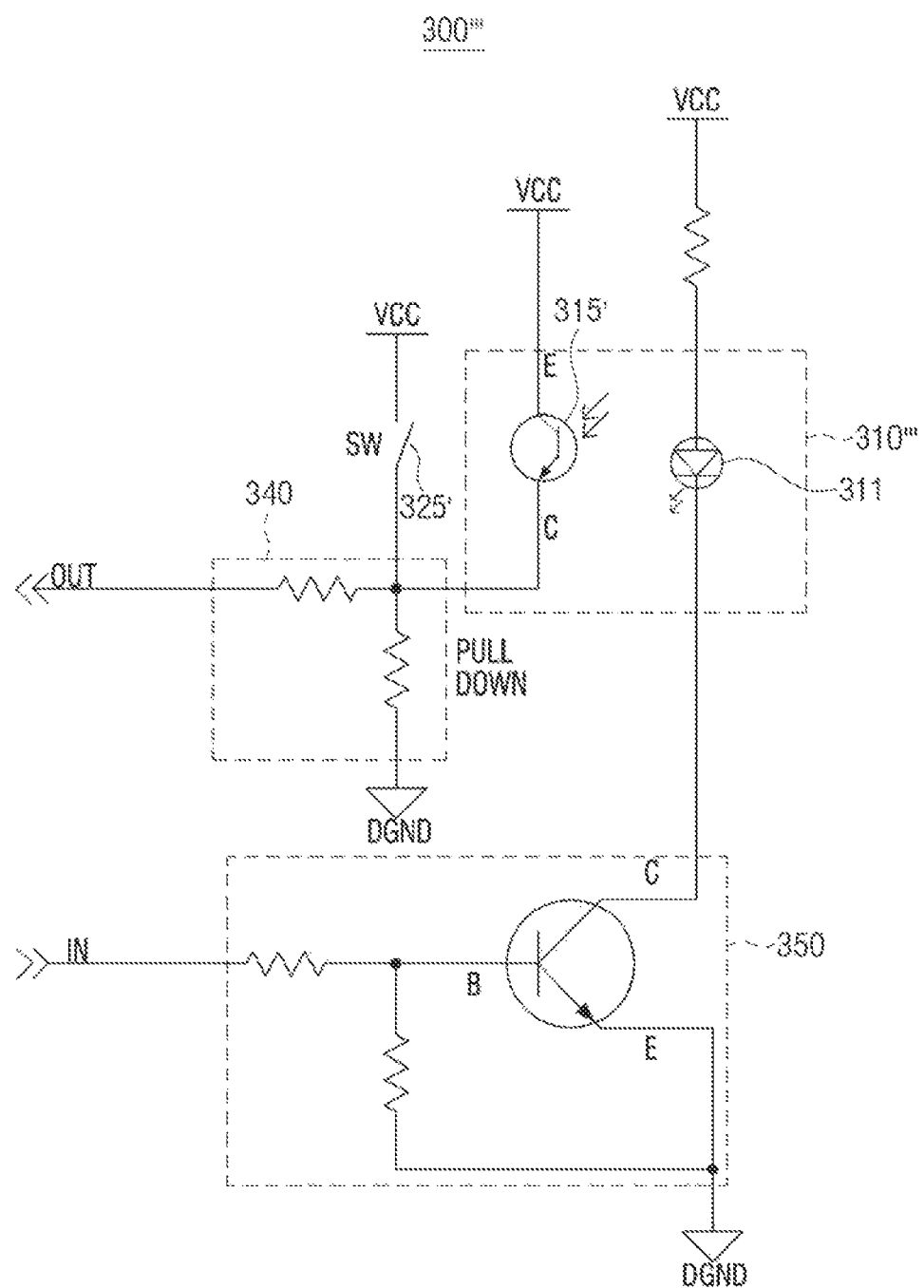
FIG. 10 is a circuit diagram of an example detection circuit.

FIG. 10 is a circuit diagram of an example detection circuit 300'" that includes a pull-down circuit 340 and a PNP light receiver 315'.

Referring to FIG. 10, the detection circuit 300'" may include a toner amount detection sensor 310'", a switch 325', the pull-down circuit 340, and the driving circuit 350.

The operations of the light emitter 311 and the driving circuit 350 are similar to the operations of FIG. 7.

One end of the PNP light receiver 315' may be connected to the switch 325' and to the pull down circuit 340, and the other end may be connected to a power supply terminal.

The switch 325' may be opened when the waste toner container 200 is mounted, and the switch 325' may be shorted (e.g., closed) when the waste toner container 200 is detached. One end of the switch 325' may be connected to the pull-down circuit 340 and to the PNP light receiver 315', and the other end may be connected to the power supply terminal. The switch 325' may be an interlock switch.

The pull-down circuit 340 comprising two resistances may be a circuit that outputs the voltage of the power supply terminal to the output terminal in a floating state (e.g., in a state in which a waste toner container 200 is not mounted). One end of the pull down circuit 340 may be connected to the ADC port of the processor 110, and the other end of the pull-down circuit 340 may be connected to the switch 325' and to the PNP light receiver 315'.

When the waste toner container 200 is not connected, the switch 325' of the detection circuit 300' may be turned on, and thus the ADC port of the processor 110 may be connected to the power supply terminal. When the waste toner container 200 is not connected, the detection circuit 300' may output the same voltage as the power supply terminal Vcc.

When the waste toner container 200 is connected, the switch 325' may be turned off, and a voltage value associated with the amount of waste toner may be output, within a voltage range from 0V to a voltage that is less than the voltage of the power supply terminal by a predetermined voltage value.

Therefore, when the same voltage as the magnitude of the power supply terminal is input to the processor 110, the processor 110 may determine that the waste toner container 200 is not mounted.

When the voltage value within the voltage range is input to the processor 110, the processor 110 may calculate the amount of waste toner associated with the input voltage value. As the amount of waste toner in the waste toner container 200 increases, the voltage value of the PNP light receiver 315' increases. For example, the output voltage value of the detection circuit 300'" may be proportional to the amount of waste toner.

Figure 11:
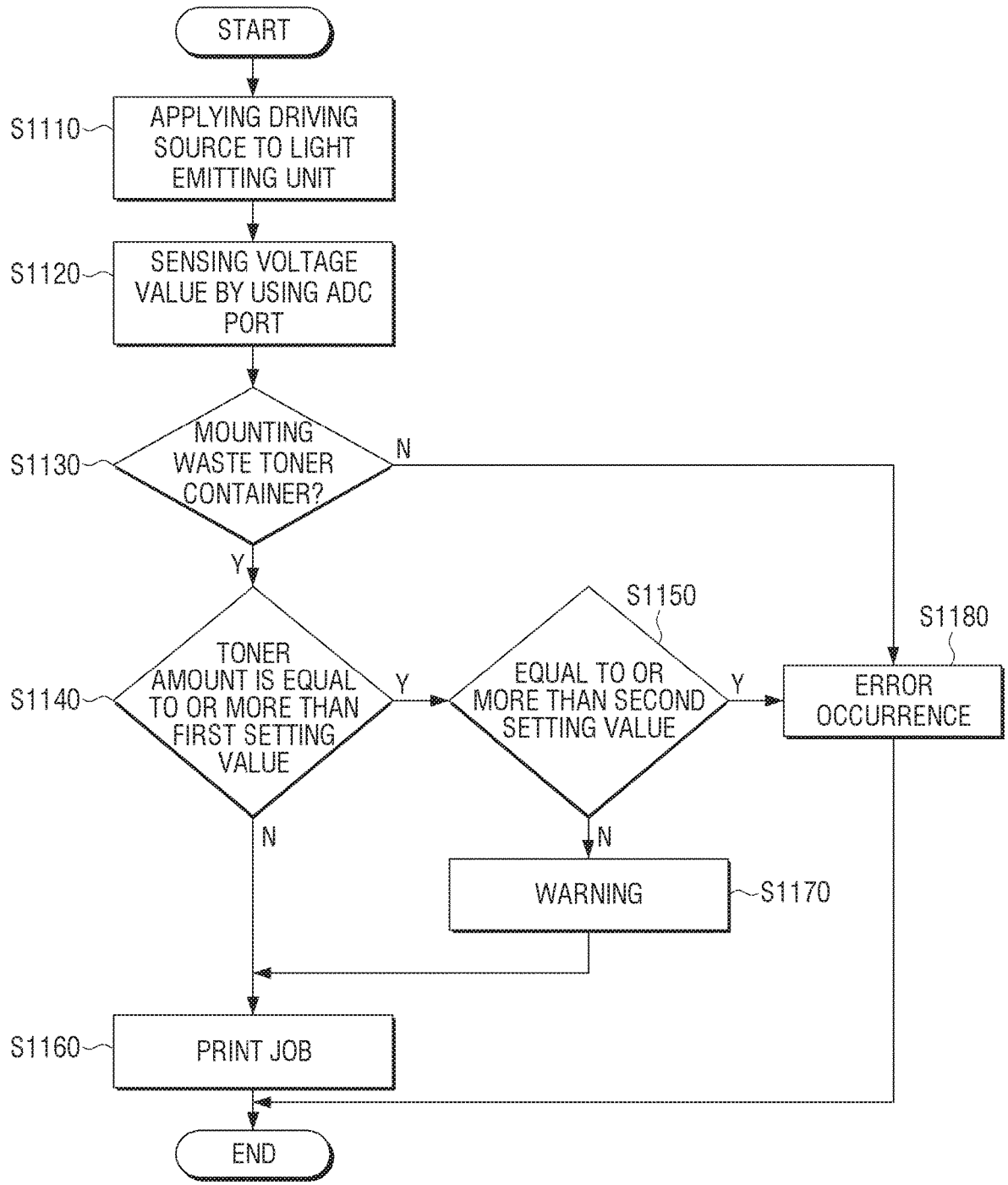
FIG. 11 is a flowchart of an example method for detecting an amount of waste toner and detecting a waste toner container.

FIG. 11 is a flowchart illustrating an example method for detecting an amount of waste toner and detecting a presence of a waste toner container on the body.

Referring to FIG. 11, when the mounting of the waste toner container and the amount of waste toner in the waste toner container are to be detected, a driving power may be supplied to the light emitter at operation S1110.

The output voltage value of the driving circuit may be sensed through the ADC port at operation S1120.

Whether the waste toner container is mounted or not may be sensed based on the sensing value at operation S1130. For example, when a pull-up circuit and an NPN light receiver are used, or when a pull-down circuit and a PNP light receiver are used, the waste toner container may be determined as being detached when the sensed voltage value is Vcc. When the sensed voltage value is equal to or less than Vcc, the waste toner container may be determined as being mounted.

In other examples, when a pull-up circuit, and an NPN light receiver are used, or when a pull-down circuit and a PNP light receiver are used, if the sensed voltage value is 0V, the waste toner container may be detected as being detached. If the sensed voltage is equal to or more than the voltage value of 0V, the waste toner container may be determined as being mounted.

When the waste toner container is mounted, it may be determined whether the sensed voltage value is equal to or more than a first setting value (e.g., a first threshold value) at operation S1140, where the first setting value may be associated with a warning value.

If the sensed voltage value is less than the first setting value at operation S1140 (arrow "N"), a print job may be performed in a normal mode at operation SS160.

If the sensed voltage value is greater than the first setting value, it may be determined whether the value is equal to or more than the second setting value, which may indicate that the waste toner is full in the waste toner container, at operation S1150.

If the sensed voltage value is less than the second setting value (e.g., a second threshold value) at operation S1150 (arrow "N"), a user or a manager may be warned, and the operation mode of the image forming apparatus may be changed to a warning mode at operation S1170. A print job may also be performed in the warning mode.

If the sensed voltage value is equal to or greater than the second setting value at operation S1150 (arrow "Y"), the operation mode of the image forming apparatus may be changed to an error mode at operation S1180. When entering the error mode, the image forming apparatus may be prevented from performing the print job.

As described above, the method for detecting the amount of waste toner and a waste toner container may reduce costs because a single sensor detects the mounting of the waste toner container and the amount of waste toner in the waste toner container, and enable a system design with reduced limitations (e.g., with minimal complexity) because the processor detects the mounting of the waste toner container and the amount of waste toner by using a single port.

The above-described sensing method (or detection method) may be implemented by a program, in the form of processor-readable data and instructions stored on one or more memory device, and provided to an image forming apparatus. For example, the data and instructions of the program containing a sensing or detection method may be stored and provided in a non-transitory computer readable medium.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

What is claimed is:
1. An image forming apparatus, comprising:
a main body;
a print engine within the main body, the print engine to form an image by using a toner;
a waste toner container to collect a waste toner generated by the print engine, the waste toner container being detachably mountable to the main body;
a detection circuit including a toner amount detection sensor to output a voltage value associated with an amount of waste toner in the waste toner container and a switch to selectively output the voltage value depending on whether the waste toner container is mounted to or detached from the main body, wherein the switch is to close based on the waste toner container being mounted to the main body and to open based on the waste toner container being detached from the main body; and
a processor to determine whether printing is available based on the voltage value outputted from the detection circuit.

2. The image forming apparatus according to claim 1, wherein the toner amount detection sensor includes a light emitter and a light receiver disposed adjacent the light emitter.

3. The image forming apparatus according to claim 2,
wherein the detection circuit comprises a pull-up circuit connected to an Analog Digital Converter (ADC) port of the processor,
wherein the switch is connected between the pull-up circuit and the light receiver, and
wherein the light receiver is a Negative-Positive-Negative (NPN) light receiver connected between the switch and a ground.

4. The image forming apparatus according to claim 2, wherein the detection circuit comprises a pull-down circuit connected to an Analog Digital Converter (ADC) port of the processor,
wherein the switch is connected between the pull-down circuit and the light receiver, and
wherein the light receiver is a Negative-Positive-Negative (NPN) light receiver connected between the switch and a power supply terminal.

5. The image forming apparatus according to claim 2,
wherein the waste toner container includes an optical member disposed in the waste toner container, to introduce light to an inside of the waste toner container,
wherein the light emitter is disposed at a position aligned with the optical member of the waste toner container, to irradiate light onto the optical member, and
wherein the light receiver is disposed adjacent the light emitter to receive light reflected from the waste toner container.

6. The image forming apparatus according to claim 2, wherein the toner amount detection sensor includes a guide member to guide light irradiated from the light emitter in a forward direction.

7. The image forming apparatus according to claim 2, wherein the processor is to control the light emitter to irradiate light, based on a predetermined event occurring, and to receive a voltage value from the detection circuit based on the light emitter irradiating light.

8. The image forming apparatus according to claim 1,
wherein the waste toner container comprises a contact surface to contact the main body based on the waste toner container being mounted to the main body, and a protrusion member protruding from the contact surface, and
wherein the switch is positioned on the main body to align with the protrusion member of the waste toner container.

9. The image forming apparatus according to claim 8, wherein the switch is an interlock switch.

10. The image forming apparatus according to claim 9,
wherein the processor includes an Analog Digital Converter (ADC) port to receive the voltage value, and
wherein the processor is to determine whether the waste toner container is mounted onto the main body and the amount of waste toner in the waste toner container based on the voltage value received by the ADC port.

11. The image forming apparatus according to claim 10, wherein the processor is to:
determine whether the waste toner container is mounted to the main body or detached from the main body,
determine the amount of waste toner contained in the waste toner container,
identify a warning state as an operational state of the image forming apparatus based on the amount of waste toner in the waste toner container being equal to or greater than a first threshold value, and identify an error state as the operational state of the image forming apparatus based on the waste toner container not being mounted to the main body or based on the amount of waste toner in the waste toner container being equal to or greater than a second threshold value that is greater than the first threshold value.

12. The image forming apparatus according to claim 8,
wherein the switch includes two terminals spaced apart from each other, and
wherein the protrusion member includes a conductive member disposed on the surface of the protrusion member, to electrically connect the two terminals based on the waste toner container being mounted onto the main body of the image forming apparatus.

13. An image forming apparatus comprising:
a main body to detachably mount thereto a waste toner container to collect waste toner;
a print engine within the main body, the print engine to form a toner image, the print engine to generate the waste toner based on forming the toner image;
a detection circuit including a toner amount detection sensor to output a voltage value associated with an amount of waste toner in the waste toner container based on the waste toner container being mounted to the main body, and a switch to selectively output the voltage value depending on whether the waste toner container is mounted to or detached from the main body, wherein the switch is to close based on the waste toner container being mounted to the main body and to open based on the waste toner container being detached from the main body; and
a processor to determine whether printing is available based on the voltage value outputted from the detection circuit.

14. An image forming apparatus, comprising:
a main body;
a print engine within the main body, the print engine to form an image by using a toner;
a waste toner container to collect a waste toner generated by the print engine, the waste toner container being detachably mountable to the main body;
a detection circuit including a toner amount detection sensor to output a voltage value associated with an amount of waste toner in the waste toner container and a switch to selectively output the voltage value depending on whether the waste toner container is mounted to or detached from the main body, wherein the switch is to open based on the waste toner container being mounted to the main body and to close based on the waste toner container being detached from the main body; and
a processor to determine whether printing is available based on the voltage value outputted from the detection circuit.

15. The image forming apparatus according to claim 14,
wherein the toner amount detection sensor includes a light emitter and a light receiver disposed adjacent the light emitter,
wherein the detection circuit comprises a pull-up circuit connected to an Analog Digital Converter (ADC) port of the processor,
wherein the switch is connected between the pull-up circuit and a ground, and
wherein the light receiver is a Positive-Negative-Positive (PNP) light receiver including a first end connected to the pull-up circuit and to the switch, and a second other end connected to the ground.

16. The image forming apparatus according to claim 14,
wherein the toner amount detection sensor includes a light emitter and a light receiver disposed adjacent the light emitter,
wherein the detection circuit includes a pull-down circuit connected to an Analog Digital Converter (ADC) port of the processor,
wherein the switch is connected between the pull-down circuit and a power supply terminal, and
wherein the light receiver is a Positive-Negative-Positive (PNP) light receiver including a first end connected to the pull-down circuit and to the switch, and a second end connected to the power supply terminal.

17. The image forming apparatus according to claim 14,
wherein the waste toner container comprises a contact surface to contact the main body based on the waste toner container being mounted to the main body, and a protrusion member protruding from the contact surface, and
wherein the switch is positioned on the main body to align with the protrusion member of the waste toner container.

18. The image forming apparatus according to claim 17,
wherein the switch includes two terminals spaced apart from each other, and
wherein the protrusion member includes a conductive member disposed on the surface of the protrusion member, to electrically connect the two terminals based on the waste toner container being mounted onto the main body of the image forming apparatus.

19. The image forming apparatus according to claim 17, wherein the switch is an interlock switch.

20. The image forming apparatus according to claim 19,
wherein the processor includes an Analog Digital Converter (ADC) port to receive the voltage value, and
wherein the processor is to determine whether the waste toner container is mounted onto the main body and the amount of waste toner in the waste toner container based on the voltage value received by the ADC port.

* * * * *